United States Patent
Wang et al.

(10) Patent No.: US 12,360,607 B2
(45) Date of Patent: Jul. 15, 2025

(54) MID-AIR-GESTURE EDITING METHOD, DEVICE, DISPLAY SYSTEM AND MEDIUM

(71) Applicant: BOE Technology Group Co., Ltd., Beijing (CN)

(72) Inventors: Jingru Wang, Beijing (CN); Fanhao Kong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/274,103

(22) PCT Filed: Sep. 29, 2022

(86) PCT No.: PCT/CN2022/122381
§ 371 (c)(1),
(2) Date: Jul. 25, 2023

(87) PCT Pub. No.: WO2024/065345
PCT Pub. Date: Apr. 4, 2024

(65) Prior Publication Data
US 2024/0427423 A1 Dec. 26, 2024

(51) Int. Cl.
G06F 3/01 (2006.01)
G06F 3/04883 (2022.01)
G06V 40/20 (2022.01)

(52) U.S. Cl.
CPC .......... *G06F 3/017* (2013.01); *G06F 3/04883* (2013.01); *G06V 40/28* (2022.01)

(58) Field of Classification Search
None
See application file for complete search history.

(56) References Cited

U.S. PATENT DOCUMENTS

| 10,620,713 | B1 | 4/2020 | Ng et al. | |
|---|---|---|---|---|
| 2016/0154469 | A1* | 6/2016 | Zhao | G06F 3/0304 345/158 |
| 2018/0260034 | A1 | 9/2018 | Liu | |
| 2020/0410222 | A1* | 12/2020 | Chang | G06F 18/2413 |
| 2021/0405762 | A1* | 12/2021 | Liu | G06V 40/28 |
| 2023/0100689 | A1* | 3/2023 | Chiu | G06F 3/013 345/157 |

(Continued)

FOREIGN PATENT DOCUMENTS

| CN | 105320248 A | 2/2016 |
|---|---|---|
| CN | 105302298 B | 5/2017 |

(Continued)

*Primary Examiner* — Tuan S Nguyen
(74) *Attorney, Agent, or Firm* — WHDA, LLP

(57) ABSTRACT

The present disclosure provides a mid-air-gesture editing method, device, display system and medium, the method is applied to a display device, and includes: recognizing a hand gesture in an acquired first gesture image to obtain a posture category; triggering an editing event corresponding to the posture category, different posture categories corresponding to different editing events; in response to the editing event, processing a mapping position corresponding to at least one frame of a second gesture image, and acquiring a processing result, wherein the mapping position is obtained after mapping a position of a key point in the second gesture image to an editing interface of the display device; and adding the processing result in the editing interface.

11 Claims, 4 Drawing Sheets

(56) References Cited

U.S. PATENT DOCUMENTS

2023/0109787 A1* 4/2023 O'Leary ............. H04L 12/1822
348/14.09

FOREIGN PATENT DOCUMENTS

| CN | 105320248 B | 12/2018 |
|----|-------------|---------|
| CN | 108932053 A | 12/2018 |
| CN | 109344793 A | 2/2019 |
| CN | 113867521 A | 12/2021 |
| CN | 114327064 A | 4/2022 |
| CN | 114415830 A | 4/2022 |
| CN | 114745579 A | 7/2022 |

* cited by examiner

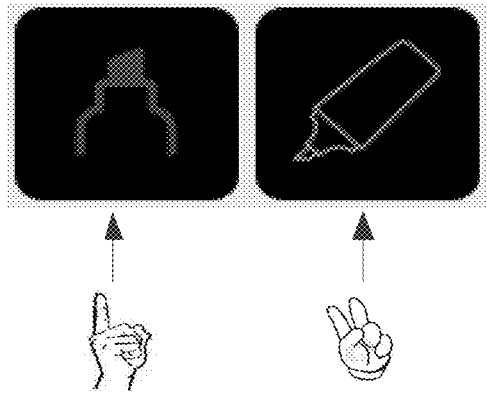

FIG. 3

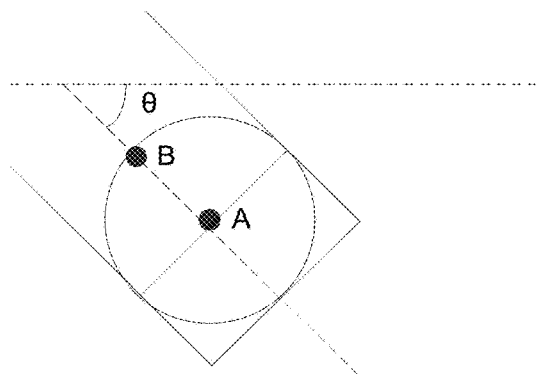

FIG. 4

| determining hand description information for describing a feature of a hand in the second gesture image based on the plurality of second gesture images successively acquired in response to a mid-air writing event | ~S501 |

↓

| determining a starting mapping position and an ending mapping position from the plurality of mapping positions based on the hand description information | ~S502 |

↓

| generating a handwritten track based on the mapping position(s) between the starting mapping position and the ending mapping position | ~S503 |

FIG. 5

MID-AIR-GESTURE EDITING METHOD, DEVICE, DISPLAY SYSTEM AND MEDIUM

FIELD

The present disclosure relates to the technical field of information processing, and in particular, to a mid-air-gesture editing method, device, display system and medium.

BACKGROUND

Currently, users have editing requirements for the contents of documents, pictures, etc. and when editing is performed, the user needs to input the user's operation to a computer by means of a specific input device so as to complete the editing of the contents, for example, inputting the operation to the computer by means of a mouse and a keyboard so as to achieve the editing.

However, this approach is highly dependent on the input device, limiting the application scenario for editing.

SUMMARY

The present disclosure provides a mid-air-gesture editing method applied to a display device, the method includes:
  recognizing a hand gesture in an acquired first gesture image to obtain a posture category;
  triggering an editing event corresponding to the posture category, different posture categories corresponding to different editing events;
  in response to the editing event, processing a mapping position corresponding to at least one frame of a second gesture image, and acquiring a processing result, wherein the mapping position is obtained after mapping a position of a key point in the second gesture image to an editing interface of the display device; and
  adding the processing result in the editing interface.

In an optional implementation, the editing event comprises a cursor editing event, and in response to the editing event, processing a mapping position corresponding to at least one frame of a second gesture image comprises:
  determining a cursor position corresponding to the second gesture image based on the mapping position corresponding to the second gesture image; and
  the adding the processing result in the editing interface comprises:
  displaying the cursor at the cursor position in the editing interface.

In an optional implementation, the method further comprises:
  acquiring an initial cursor position;
  wherein determining the mapping position corresponding to the second gesture image comprises:
  determining the mapping position corresponding to the second gesture image based on the initial cursor position and the position of the key point in the second gesture image.

In an optional implementation, acquiring an initial cursor position comprises:
  recognizing hand information of a third gesture image; and
  determining the initial cursor position based on a recognition result of the third gesture image.

In an optional implementation, the method further comprises:
  determining a starting position of mid-air writing based on the cursor position.

In an optional implementation, the editing event comprises a mid-air writing event, and in response to the editing event, processing a mapping position corresponding to at least one frame of a second gesture image comprises:
  generating a handwritten trace based on a plurality of mapping positions in response to the mid-air handwriting event; and
  the adding the processing result in the editing interface comprises:
  adding each handwritten trace in the editing interface.

In an optional implementation, generating a handwritten trace based on the plurality of mapping positions in response to the mid-air handwriting event comprises:
  determining editing areas where the plurality of mapping positions are located on the editing interface;
  determining a line width corresponding to the editing areas; and
  generating the handwritten trace according to the line width and the plurality of mapping positions.

In an optional implementation, the determining a line width corresponding to the editing areas comprises:
  recognizing a format of a content in the editing area to obtain a content format; and
  determining the line width based on the content format.

In an optional implementation, the line width is a preset width when the content format is a picture format.

In an optional implementation, when the content format is a text format, the line width is a width adapted to a text area within the editing area.

In an optional implementation, the content format includes a text format, and the determining the line width based on the content format comprises:
  acquiring a text connected area of the editing area;
  determining the line width based on a length of a short side of the text connected area.

In an optional implementation, generating a handwritten trace based on the plurality of mapping positions in response to the mid-air handwriting event comprises:
  determining a starting mapping position and an ending mapping position from the plurality of mapping positions in response to the mid-air handwriting event; and
  generating the handwritten track based on the mapping position between the starting mapping position and the ending mapping position.

In an optional implementation, determining a starting mapping position and an ending mapping position from the plurality of mapping positions comprises:
  acquiring hand description information for describing a feature of a hand in the second gesture image based on the plurality of second gesture images successively acquired;
  determining the starting mapping position and the ending mapping position from the plurality of mapping positions based on the hand description information.

In an optional implementation, determining hand description information based on the plurality of second multi-frame gesture images successively acquired comprises:
  determining an area of a region occupied by a target area in each frame of the second gesture image, and determining an area of a region occupied by the target area as the hand description information; wherein the target area comprises at least one area of interest in the hand, and different areas of interest corresponding to different receptive fields; and determining the starting mapping position and the ending mapping position from the plurality of mapping positions based on the hand description information comprises:
determining the starting mapping position and the ending mapping position from the plurality of mapping positions based on an amount of change in the area occupied by the target area.

In an optional implementation, determining hand description information based on the plurality of second multi-frame gesture images successively acquired comprises:
determining a depth value corresponding to the target area in a parallax image corresponding to each of the mapping positions, and taking the depth value corresponding to the target area as the hand description information; wherein, the parallax image is obtained from the second gesture images with binocular vision taken at the same moment, the target area comprises at least one area of interest in the hand, different areas of interest having different receptive fields; and
the determining the starting mapping position and the ending mapping position from the plurality of mapping positions based on the hand description information comprises:
determining the starting mapping position and the ending mapping position from the plurality of mapping positions based on an amount of change in the depth value corresponding to the target area.

In an optional implementation, determining the mapping position corresponding to each frame of the second gesture image comprises:
determining image coordinates of the key point in the second gesture image;
determining a second mapping position corresponding to the second gesture image of the current frame based on the image coordinates and a first mapping position corresponding to the second gesture image of a previous frame; wherein the first mapping position is determined based on image coordinates of the key point in the second gesture image of the previous frame.

In an optional implementation, after determining image coordinates of the key point in the second gesture image, the method comprises:
determining absolute coordinates of the key point in the second gesture image based on an image size and the image coordinates of the second gesture image; wherein the absolute coordinates are used for representing position distribution of the key points in the second gesture image; and
determining a second mapping position corresponding to the second gesture image of the current frame based on the image coordinates and a first mapping position corresponding to the second gesture image of a previous frame comprises:
determining the second mapping position based on the first mapping position, a page size of the editing interface, and the absolute coordinates.

The present disclosure discloses a display system comprising a display device, an image acquisition device, and a processing device, wherein
the image acquisition device is used for acquiring a gesture image and sending the acquired gesture image to the processing device; the processing device is used for executing the mid-air-gesture editing method; and the display device is used for displaying the processing result in the editing interface.

In an optional implementation, the image acquisition device and/or the processing device are integrated into the display device.

The present disclosure further discloses an editing device, comprising:
a first gesture recognition module for recognizing a hand gesture in an acquired first gesture image to obtain a posture category;
a triggering module for triggering an editing event corresponding to the posture category, wherein different posture categories correspond to different editing events;
a processing module for, in response to the editing event, processing a mapping position corresponding to at least one frame of a second gesture image, and acquiring a processing result; wherein the mapping position is obtained after mapping a position of a key point in the second gesture image to an editing interface;
a display module for adding the processing result in the editing interface.

The present disclosure discloses a computer-readable storage medium wherein computer programs having stored thereon cause a processor to implement the mid-air gesture editing method.

The present disclosure further discloses an electronic device, wherein a computer-readable program stored thereon may drive a processor therein to implement the mid-air gesture editing method.

The technical solution of the embodiment of the present disclosure, the hand gesture in the collected first gesture image can be recognized, and the posture category can be obtained; an edit event corresponding to the posture category is triggered, and then, in response to the edit event, process the mapping position corresponding to at least one second gesture image to obtain the processing result. Further, the processing result is added to the editing interface of the display device.

In this way, the user can select the corresponding editing event through the gestures to realize the switching of the editing event, so as to prompt the computer device to enter the process of corresponding processing of the mapping position, and obtain the processing result corresponding to the editing event to achieve the corresponding editing effect. In this way, users can edit at a certain distance from the computer device, thereby reducing the dependence on the input device and allowing users to complete editing tasks in a variety of application scenarios.

The above description is only an overview of the present disclosure of the technical solution, in order to be able to better understand the technical means of the present disclosure, and can be implemented in accordance with the content of the description, and in order to make the above and other purposes, features and advantages of the present disclosure more obvious and easier to understand, the specific embodiments of the present disclosure are hereby mentioned.

BRIEF DESCRIPTION OF THE DRAWINGS

In order to more clearly illustrate the technical solutions in the present disclosure embodiments or related art, the following will be a brief introduction to the drawings required in the embodiment or related technical description, it is clear that the drawings described below are some embodiments of the present disclosure, for those of ordinary skill in the art, without creative labor, may also obtain other drawings based on these drawings. It should be noted that the proportions in the drawings are for illustrative purposes only and do not represent the actual proportions.

FIG. 1 schematically illustrates a diagram of communication environment for presenting a document using a projection screen;

FIG. 3 schematically illustrates a correspondence diagram between different posture categories and a candidate icon when the candidate icon is a writing pen icon;

FIG. 4 schematically illustrates a diagram of drawing process of a circumscribed rectangle;

FIG. 5 schematically illustrates a flow chart of the steps of processing a plurality of mapping positions under a mid-air handwriting event;

DETAILED DESCRIPTION

In order to make the purpose, technical solution and advantages of the present disclosure embodiments clearer, the following will be combined with the accompanying drawings in the embodiments of the present disclosure, the technical solutions in the embodiments of the present disclosure are clearly and completely described, obviously, the described embodiments are part of the embodiment of the present disclosure, not all embodiments. Based on the embodiments in the present disclosure, all other embodiments obtained by those of ordinary skill in the art without performing creative labor fall within the scope of the protection of the present disclosure.

In view of the problems in the related art, the present disclosure provides an editing solution based on a mid-air-gesture, which is convenient for a user to use and may satisfy the user's editing in various application scenarios, and the specific core idea is as follows: image acquisition is performed on a user, a gesture in the acquired image is recognized, and a trigger of a corresponding editing event is realized according to the recognized gesture. Then, in response to the triggered editing event, a mapping position of a key point in the acquired gesture image on an editing interface is processed, and a processing result is added in the editing interface, so that the user may complete an editing operation at a medium-long distance from a display device without contacting the display device or using an input device provided by the display device, i.e., at a certain spatial distance.

In this way, a user may enter a corresponding editing event only through a gesture, so that under the editing event, a mapping position corresponding to the gesture image is processed as a processing result corresponding to the editing event, so as to meet a variety of editing requirements of the user. In this way, the degree of dependence on input devices such as a keyboard and a mouse in editing processing may be reduced, so that the user may realize editing processing in the case of a certain distance from a computer device, and the user may use the computer device to perform editing in a variety of application scenarios.

The scenarios that may be applied using the technical solutions provided by the embodiments of the present disclosure include: a scene far away from an all-in-one machine, a scene of representing a document using a projection screen, or, in practice, a scene which may not be limited to the foregoing application scenarios.

Figure 1:
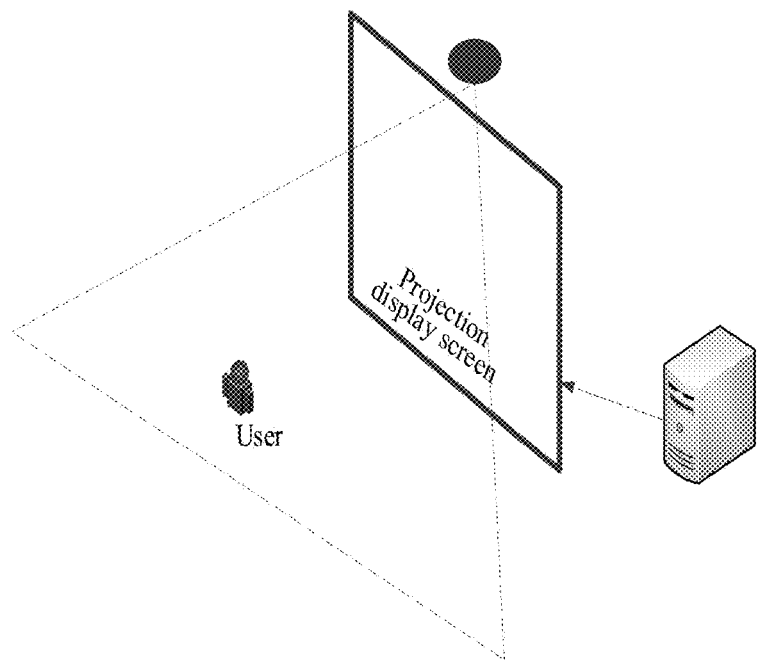

With reference to FIG. 1, a diagram of communication environment for presenting a document using a projection screen is shown, which, as shown in FIG. 1, includes a projection display screen, a computer and a camera device. The projection display screen may be an LED or LCD large screen, and in some cases may also be a projection screen cloth which may be used as a display of the computer to display relevant contents, and the camera device may be arranged at one side of the projection display screen to perform image acquisition on a viewing area (an area enclosed by a dotted line in FIG. 1) to which the projection display screen faces so as to acquire a gesture image of a user. The computer is respectively connected to the projection display screen and the camera device, and is used for receiving the gesture image acquired by the camera device, performing editing processing based on the gesture image, and displaying a processing result on the projection display screen. So that a user may edit the content in the edited interface by means of gesture transformation and finger movement standing in front of the projection display screen, and such a scene may be applied to a scene requiring document presentation in a large conference.

In a communication environment of yet another mid-air-gesture editing method, an all-in-one machine may be included, wherein a display screen, a camera and a processor are provided on the all-in-one machine, the camera may be used for image acquisition of a user located in front of the all-in-one machine to obtain a gesture image, and the processor is connected to the camera and the display screen for receiving the gesture image acquired by the camera and processing a document based on the gesture image, so that the user may edit the document on the all-in-one machine through a gesture without approaching the all-in-one machine.

Certainly, in practice, the method may also be applied to other communication environments in addition to the above-mentioned communication environment, so as to adapt the editing requirements in different scenes. For example, in an editing scene based on a tablet or a mobile phone, the mid-air-gesture editing method of the present disclosure may also be used, so that the hand of a user may edit the contents displayed in the tablet and the mobile phone without contacting the screen of the tablet and the mobile phone.

Figure 2:
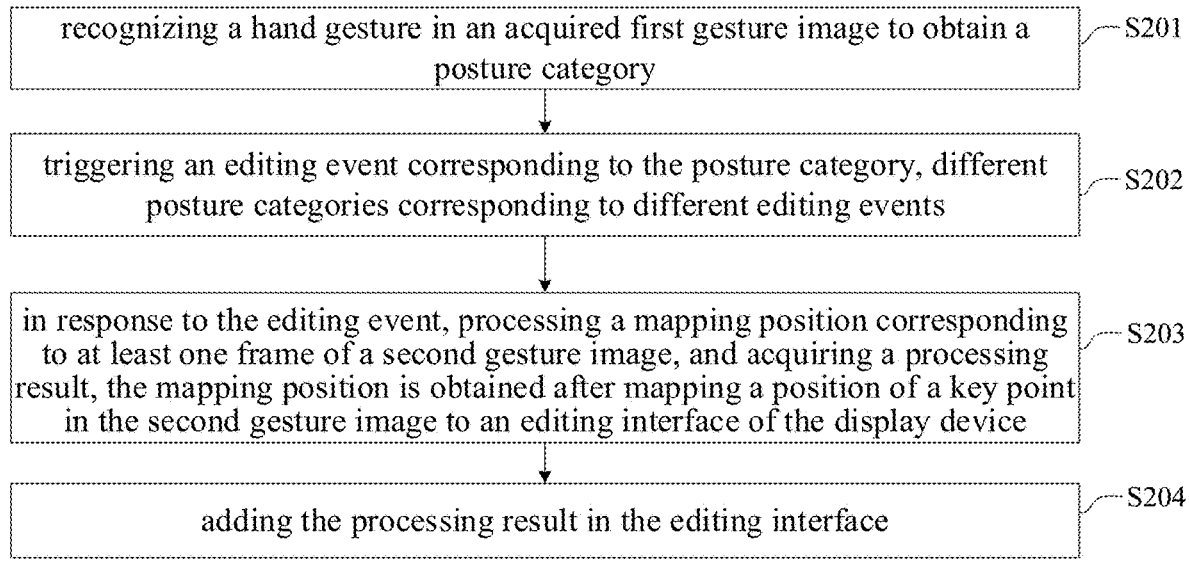
FIG. 2 schematically illustrates a flow chart of the steps of a mid-air-gesture editing method.

In conjunction with the description shown in FIG. 1, an embodiment of the mid-air-gesture editing method of the present disclosure is described, and with reference to FIG. 2, a flow chart of the steps of the mid-air-gesture editing method is shown. As shown in FIG. 2, the method may be applied to a display device with an editing function, such as an all-in-one machine, a personal computer, a tablet and a mobile phone, and specifically may include the following steps:

step S201: recognizing a hand gesture in an acquired first gesture image to obtain a posture category;

step S202: triggering an editing event corresponding to the posture category, different posture categories corresponding to different editing events;

step S203: in response to the editing event, processing a mapping position corresponding to at least one frame of a second gesture image, and acquiring a processing result, wherein the mapping position is obtained after mapping a position of a key point in the second gesture image to an editing interface of the display device;

step S204: adding the processing result in the editing interface.

In this embodiment, an image acquisition may be performed on a user, and specifically, an image acquisition device, such as a camera, may be arranged at one side of a display screen, and the image acquisition device may perform image acquisition on a viewing area in front of the display screen. In particular, when a target condition is satisfied, the image acquisition device may be triggered to perform image acquisition, and specifically, the target condition may be a condition that a person is located in the viewing area is detected. They condition may be a condition that it is detected that a person lifts a hand, or a user issues a trigger instruction for editing, such as a voice instruction or a keyboard operation instruction. Then, when the image acquisition is triggered, the acquired gesture image may be recognized to obtain a posture category. This embodiment enables the image acquisition device to perform the image acquisition task only when the target condition is satisfied, so that the workload of the image acquisition device may be reduced and the service life of the image acquisition device may be extended.

Since the image acquisition is triggered, the user may enter an editing mode of mid-air-gesture editing, and the meaning of mid-air may be understood as that the user may achieve contactless editing at a middle and long distance from the screen of the display device without touching the display screen or using an input device.

The present disclosure abstracts the editing processing performed in dependence on the input device into various editing events through characterization of a plurality of editing events, for example, editing processing such as changing cursor position in dependence on a mouse, typing text in dependence on a keyboard, annotation in dependence on a mouse, etc., so that a user may select a corresponding editing event through gesture transformation so as to perform corresponding editing processing to achieve a desired editing effect.

In particular, the corresponding editing event may be determined by recognizing the posture category of the hand gesture of the first gesture image, that is to say, each editing event abstracted in the present disclosure may correspond to a posture category, and a user may gesticulate a corresponding gesture, namely, selecting a corresponding editing event.

Editing events in the present disclosure may include: for example, a cursor editing event, an annotation event, a text editing event, a page setting event, etc. The cursor editing event refers to a movement of a cursor, and the text editing event refers to a mode of editing content, such as adding text content, modifying text content, deleting text content, etc. The annotation event may refer to marking some contents in the editing interface so as to make the marked contents more conspicuous. A page setting event may refer to zooming in or out of a page, a page split display, etc.

In practice, in order to facilitate a user to select a desired editing event, different icons may be set for different editing events, so that the user may gesticulate different hand gestures, select corresponding icons, and then trigger an editing event.

In an alternative example, the posture categories corresponding to the plurality of editing events may constitute a gesture group dedicated to selecting an editing event, the plurality of posture categories in the gesture group may be different gestures of the same finger, e.g., a shape in which a thumb and an index finger are bent to form an "O" shape corresponds to an editing event, a shape in which a thumb and an index finger are straight and perpendicular to each other corresponds to an editing event, and a shape in which a thumb and an index finger are bent to form a "C" shape corresponds to an editing event.

As another example, a different number of straightened fingers may constitute a plurality of posture categories in a gesture group, such as straightening one finger for an editing event, straightening two fingers for an editing event, and straightening three fingers for an editing event. Certainly, the foregoing is merely exemplary and does not represent a limitation of the present disclosure on gestures corresponding to editing events.

A posture category corresponding to a hand gesture in the gesture image may be recognized to determine which hand gesture in the gesture group matches the hand gesture in the gesture image, and a posture category of the matched hand gesture in the gesture group may be taken as the recognized posture category. For example, if the hand gesture in the gesture image matches the posture in which the thumb and index finger are bent to form an "O" shape, the posture category "1" in which the thumb and index finger are bent to form an "O" shape is taken as the recognized posture category.

After the posture category is obtained, the editing event corresponding to the posture category may be triggered. As stated above, one editing event corresponds to one editing effect so as to satisfy different editing requirements of a user. Therefore, triggering a corresponding editing event may be understood as triggering a corresponding editing function. Since the present disclosure is directed to the editing in mid-air, triggering a corresponding editing function may be understood in practice as triggering a corresponding response logic.

After an editing event is triggered, a corresponding response logic may be started so as to process a mapping position corresponding to the second gesture image, wherein the second gesture image is obtained by an image acquisition device performing continuous image acquisition on a viewing area, while continuous image acquisition may refer to acquiring an image according to a predetermined time interval, and the predetermined time interval may be set to a very short time, such as one ms. Certainly, in order to balance speed of gesture recognition and computer processing performance, the time interval may be set to a time in the range from two ms to ten ms.

A key point in each frame of continuously acquired gesture image may be recognized, wherein the key point may be a key point on a finger, a key point on the palm, or a key point on the back of the hand, which may be specifically set according to an event condition. For example, the key point may be the position of a fingertip, such as the position of an index finger tip. Of course, in order to improve the scope of application of the present disclosure, the key point may be not limited to the position of an index finger tip. For example, the key point may be the position of a thumb fingertip, which is not limited herein.

The position where the key point is located in the gesture image may be mapped into the editing interface to obtain a mapping position in the editing interface. The position of the key point in the gesture image may be a coordinate position of the key point in the gesture image, and when the coordinate position is mapped into the editing interface, a coordinate conversion relationship may be established based on respective coordinate systems of the gesture image and the editing interface. Then the coordinate position of the key point is converted into a coordinate position in the editing interface page, and then the mapping position is obtained.

The coordinate position of the key point may also be converted into a mapping position based on a size of the gesture image and a size of the editing interface, which may be described in detail in the subsequent embodiments.

After obtaining the corresponding mapping position of each second gesture image, a plurality of mapping positions may be processed according to the triggered editing event, and the plurality of mapping positions are processed as the editing result required by the user, so as to add the processing result in the editing interface.

The processing of the plurality of mapping positions according to the triggered editing events may be understood as converting the plurality of mapping positions into editing effects corresponding to the editing events triggered by the user. For example, if the editing event started by the user is the text editing event, and text needs to be added to the document, the text specifically converted at the plurality of mapping positions may be added to the document. If the editing event started by the user is the annotation event, and contents need to be marked in the document, a plurality of mapping positions may be converted into lines with a certain transparency and added in the document. If the editing event started by the user is the page setting event, and the editing interface needs to be enlarged, reduced or split, the plurality of mapping positions may be converted into the editing effect of enlarging or reducing the content of the area where the mapping positions are located.

With the technical solution of the embodiments of the present disclosure, based on the recognition of the hand gesture in the acquired first gesture image, a corresponding editing event may be triggered, then the mapping position corresponding to the second gesture image may be processed according to the triggered editing event, and the result obtained by the processing is added in the editing interface.

In this way, a corresponding editing event may be directly triggered by a hand gesture, so as to perform corresponding processing on a mapping position based on the triggered editing event so as to achieve a corresponding editing effect, such that a user may realize various editing requirements without using an operation device such as a mouse, reducing the degree of dependence on an input device of a computer in scenes such as document presentation, processing and editing, and the user's requirements for editing content at a medium and long distance may be satisfied, thus breaking through the limitation on the editing application scenario and being applicable to editing under various application scenarios.

As stated above, in order to facilitate a user in selecting the editing event via a gesture, a corresponding candidate icon may be set for each editing event, and the user may know the required editing event by stroking the gesture corresponding to each candidate icon, so as to facilitate the user's selection and achieve the same operation experience as using a mouse to select the editing event.

Accordingly, in an alternative embodiment, before recognizing hand gestures in the acquired gesture image to obtain a posture category, a plurality of candidate icons may also be displayed, wherein different candidate icons correspond to different editing events. Thereafter, upon recognizing the posture category, a candidate icon corresponding to the posture category may be highlighted to indicate that the corresponding editing event is selected.

In an alternative example, the candidate icons may be icons with a writing pen, and different candidate images may be different writing pens, such that the writing pens may assist the user in quickly determining the respective corresponding editing events. Of course, in practical use, the candidate icon may not be limited to a writing pen, but may also be another type of icon, such as a text icon, so as to more intuitively indicate a corresponding editing event.

Highlighting may refer to that color brightness of the candidate icon is enhanced in contrast to the non-selected icon. Of course, in practice, it is also possible to switch to a designated color to display the candidate icon, which is not limited herein.

As described above, the editing event may include a cursor editing event, an annotation event and a text editing event, wherein, in the cursor editing event, a display position of the cursor may be continuously changed according to a movement track of a plurality of mapping positions so as to achieve the editing effect of moving the cursor by the user. In the annotation event, lines with a certain transparency may be generated based on the plurality of mapping positions so as to achieve the editing effect of annotating the content. However, in the text editing event, a corresponding handwritten word may be generated based on the plurality of mapping positions so as to achieve the editing effect of typing a text in the editing interface. The present disclosure describes the foregoing three editing events separately.

In one example, since the annotation event and the text editing event both add a handwritten track in the editing interface, for example, under the annotation event, the handwritten track is a hand-drawn line, while under the text editing event, the handwritten track is a handwritten text, the annotation event and the text editing mode may be collectively referred to as an mid-air handwriting event, that is to say, the mid-air handwriting event includes the annotation event and the text editing event.

In this case, the candidate icons may include a primary icon and a secondary icon, wherein the primary icon corresponds to the cursor editing event and the mid-air handwriting event, and the secondary icon may correspond to the annotation event and the text editing event in the mid-air handwriting event.

In particular, the primary icon may include a mouse icon and an icon of writing by holding a pen, wherein the mouse icon edits corresponds to the cursor editing event, and the icon of writing by holding a pen corresponds to the mid-air handwriting event, which may be selected via different gestures.

The secondary icon may be a writing pen icon, including two writing pens, such as a marker pen and a signature pen, wherein the marker pen corresponds to the annotation event, and the characterization needs annotating the content on highlight based on a bright color, and the signature pen corresponds to the text editing event, and the characterization needs handwriting text based on ink.

With reference to FIG. 3, a correspondence diagram between different posture categories and a writing pen icon is shown in case the candidate icon is a writing pen icon. As shown in FIG. 3, the posture category may be the number of straightened fingers mentioned above, and if the number of protruding fingers is one, a marker, such as the writing pen icon on the left side in FIG. 3, is in correspondence, thereby starting the above-mentioned annotation event; if the number of protruding fingers is two, a signature pen 2, e.g., the writing pen icon on the right side in FIG. 3, is in correspondence, thereby starting the text editing event.

<Annotation Event/Text Editing Event>

In the present disclosure, since the annotation event and the text editing event both add a handwritten track in the editing interface, for example, under the annotation event, the handwritten track is a hand-drawn line, while under the text editing event, the handwritten track is a handwritten text, the handwritten trace may be generated based on the plurality of mapping positions in response to the mid-air handwriting event. Accordingly, individual handwritten traces may be added in the editing interface.

As described above, the handwritten traces may be handwritten lines or handwritten text.

The plurality of mapping positions may be fitted according to the chronological order thereof, so as to obtain the handwritten track.

When the handwritten track is generated, a corresponding line width may be selected for the handwritten track, and the line width may be preset by a user, and may also be determined according to an editing area where the mapping position is located, and when specific implementation is performed, editing areas where the plurality of mapping positions are located may be determined on the editing interface, and a line width corresponding to the editing area may be determined. The handwritten trace is generated according to the line width and the plurality of mapping positions.

The editing area may be an editing area where the plurality of mapping positions are located, and the editing area may be an area for providing editing in the editing interface, or may be an area framed by the plurality of mapping positions in the area for providing editing in the editing interface. For example, in an alternative example, the position area of the plurality of mapping positions in the editing interface may be recognized to form a rectangular frame, and the area in the rectangular frame is the editing area, and in this case, areas to be annotated and to be handwritten in the editing interface may be clearly defined so as to subsequently determine the line width based on the editing area.

In yet another method, after each mapping position is obtained, an editing area with the mapping position as a central position point and the distance from the central position point as a preset distance is determined in the editing interface, so that after the editing areas corresponding to each of the plurality of mapping positions are merged, the editing areas where the plurality of mapping positions are located are obtained.

In this case, the line width may be determined according to the size of the editing area and the content in the editing area, so that the line width is adapted to the size of the editing area and the content in the editing area, not occupying more space of the editing area, and improving the aesthetics of the handwritten track.

It should be noted that, in both the text editing event and the annotation event, the line width may be determined in the above-mentioned manner. In the text editing event, the determined line width may affect the clarity and size of the handwritten words. When the line width is adapted to the size of the editing area, the handwritten words may be highlighted in the editing area or more handwritten words may be typed in the editing area. When the line width is adapted to the content size of the editing area, such as adapted to the text in the editing area, the typed handwritten words may be adapted to the font size of the existing text so as to achieve aesthetic display.

Certainly, in the case of annotation event, the determined line width may influence the visibility of the annotated content.

When specific implementation is performed, the format of the content in the editing area may be recognized to obtain a content format. Based on the content format, the line width is determined.

In an alternative example, when the format of the content in the editing area is recognized, a screenshot of the editing area may be obtained, then the screenshot is input into a pre-trained classification model, and the format of the content in the screenshot is recognized by the classification model to determine whether it is a picture or content. Here, the screenshot may be a 320*320 sized image.

The classification model may be selected from commonly used resnet18, etc, wherein the classification model is obtained by supervised training using a plurality of image samples as training samples, and the image samples may include: an image obtained by taking a screenshot of the editing area where the picture is located in the editing interface, and an image obtained by taking a screenshot of the editing area where the text is located in the editing interface.

The content format may include a picture format and a text format, and different content formats may correspond to different line widths. For example, in the case of a picture format, the corresponding line width may be determined based on the size of the picture, and in the case of a text format, the corresponding line width may be determined based on the size of the text. In the case of including both a picture format and a content format, the corresponding line width may be determined based on the size of the text.

In one example, accordingly, in the case where the content format includes a picture format, the line width is a preset width, i.e., may be a fixed line width. In this case, in the case where the editing event is the annotation event, the handwritten track generated by using the line with the fixed line width may be overlaid on the picture with the fixed width, and at the same time of marking the picture, the picture content is not entirely covered so as to be viewed by the image user. Here, the preset width may be specified by the user in advance.

In the case where the content format is the text format, the line width is the width adapted to the text area in the editing area, and in this case, in the case where the editing event is the annotation event, using the width adapted to the text area may enable the handwritten track to just cover the text area, without affecting the viewing of the adjacent uplink and downlink text while clearly marking the text area.

Accordingly, in the text format, a text connected area of the editing area may be acquired. The line width is determined based on a length of a short side of the text connected area. The text connected area refers to a continuous area formed by a plurality of texts in the editing area.

An image area may be obtained by capturing the editing area, a binarization processing is performed on the image area to obtain a binarized image, and a first corrosion and then expansion operation is performed on the binarized image to obtain a processed image. The line width is determined based on the length of the short side of the text connected area in the processed image.

In this mode, in the case where it is determined that the format of the content in the editing area is the text format, the image area obtained by capturing the editing area may be processed. Specifically, the image area may be converted into a grey scale image first, and then the grey scale image is binarized using an OTSU algorithm (OTSU method-maximum inter-class variance method), wherein the OTSU algorithm is an algorithm for determining an image binarization segmentation threshold value, and after binarization, the binarized image is obtained, wherein in the binarized image, a pixel value of a pixel point of the image is either 0 or 1, which is referred to as a black and white image.

Then, the binarized image may be subjected to a first corrosion and then expansion operation, wherein the corrosion operation may eliminate noise points on the binarized image and at the same time eliminate partial boundary values, thereby reducing the image as a whole. The dilation operation may be used to enlarge the foreground area in the image. Here, both the corrosion operation and the expansion operation may utilize 3*3 structural elements, and of course, structural elements of different sizes may be used for both.

After the dilation operation, the processed image may be obtained, and then the text connected area in the processed image may be extracted. Specifically, a connected area may be extracted from the processed image after the dilation operation, wherein the connected area may be understood to be an area connected to the pixel point with the pixel value being a preset value, and the pixel point with the preset value actually belongs to text, and then the connected area with the largest area among all the connected areas is selected, and the length of the short side thereof is the line width. Thus, in the case of the annotation event, the generated handwritten trace may be seen as a circumscribed rectangle of text portion to cover exactly the text portion.

In the case of generating a handwritten track according to the line width and the plurality of mapping positions, a preset line with the line width may be used to fit the plurality of mapping positions so as to obtain the handwritten track; or a preset line with the line width to is used to successively connect the plurality of mapping positions so as to obtain the handwritten track.

The preset line may be a color line with a certain transparency, and the color may be a grey-scale color or a color, and this is not limited. Thus, in the case where the editing event is the annotation event, the preset line adopted, due to the color transparency, makes the handwritten track not covering the original content, so as not to affect the user's view of the content under the handwritten track. Here, the transparency may be set according to actual requirements, and may be translucent, for example, without limitation. Of course, in some cases opaque preset lines may also be used to generate the handwritten trace, in which case the user may be helped to mask part of the content.

Among other things, in the case of the text editing event, the lines employed may be lines that do not have color transparency, without limitation.

Illustratively, text content and picture content may be included in the editing interface. For example, in a word document, or a Microsoft Office PowerPoint (PPT) document, pictures may be inserted in addition to text, and in the annotation event, both text and pictures may be annotated. When a text is annotated, a plurality of mapping positions thereof may be connected to form a line covering the text content, and when the picture is annotated, the plurality of mapping positions may be connected to form a line with a specified width, but the line covers a partial area of the picture.

When this embodiment is used, different degrees of marking may be performed for different formats of contents in the editing interface. For example, annotation with one type of line width may be performed on the image, and annotation with another type of line width may be performed on questions. Therein, a line annotation of one color may be used for an image and a line annotation of another color may be used for a text, so that in some scenes, it may be achieved to mark different contents in the editing interface, for example, a question and an image inside a PPT, so that the problem and the image may be distinguished by the mark.

In the annotation event, it is also possible to add the processing for starting and stopping the handwritten traces, so as to achieve the effect that the lines at the starting and stopping of the handwritten traces present a "square", and set the transparency of the preset lines to be translucent. In an alternative example, in the annotation event, the handwritten trace may be referred to as an annotation line, then for mapping position points located at two ends of the annotation line, a target sampling point with the distance from the mapping position point being the line width is sampled in the annotation line; and drawing a circumscribed rectangular frame surrounding the target sampling point and the mapping position points at both ends, and using the circumscribed rectangular frame as the end of the annotation line.

In this embodiment, the mapping position points at the two ends of the annotation line may refer to a mapping position as a starting point (starting) and a mapping position as an ending point (ending), and the starting mapping position may refer to a mapping position corresponding to the finger position of the first frame of gesture image in a plurality of frames of gesture images captured successively. By the same reasoning, the ending mapping position may refer to a mapping position corresponding to the finger position of the last frame of gesture image in a plurality of frames of gesture images captured successively.

With reference to FIG. 4, a schematic drawing process of the circumscribed rectangle of the present disclosure is shown. As shown in FIG. 5, the target sampling point of which the distance from the mapping position point is the line width may be sampled in the annotation line, and the sampling point may be a position point obtained by random sampling. As shown in FIG. 4, point B is a target sampling point, and point A is a mapping position point. Point A and point B may be connected to obtain an AB line segment.

In an alternative example, a circle may be drawn with the straight line distance between the target sampling point and the mapping position point as the radius, and then the circumscribed rectangular frame of the circle is drawn.

In yet another alternative example, the angle between the straight connection line between the target sampling point and the mapping position point and the horizontal direction may be determined first, such as the angle θ between the AB line segment and the horizontal reverse direction in FIG. 4, and then a circle is drawn with the straight line distance between the target sampling point and the mapping position point as the radius, and then a circumscribed rectangle parallel to the AB line segment is drawn with the angle θ as a reference. In this way, the circumscribed rectangular frame drawn may achieve a more aesthetically pleasing square ending effect.

Certainly, the color of the circumscribed rectangular frame may coincide with the color of the annotation line.

Therein, no matter whether it is an annotation event or a text editing event, a user's broken stroke may occur. For example, in a text editing event, a user generally writes a text in mid-air through the movement of a finger, and then maps the "handwritten word in the air" into a document so as to input a text in the document. In practice, when a user writes, there will be a problem of broken stroke between two strokes. Therefore, when processing a plurality of mapping positions, it is necessary to segment the strokes so as to improve the accuracy of inputting handwritten words in the document in the mid-air-gesture writing. However, in the annotation event, there needs to be an interval between lines, so the user will pause after drawing one line, and continue to draw another line. Therefore, it is also necessary to determine where the stoke is broken.

In one embodiment, in the process of forming the handwritten track, in order to accurately determine the broken stroke of a user in mid-air, for example, in the case where the user performs handwriting in mid-air, the stroke needs to be segmented, and thus it needs to be clear which mapping positions in the plurality of mapping positions belong to the same stroke, so as to achieve the broken stroke processing under mid-air writing. In one example, a starting mapping position and an ending mapping position may be determined from a plurality of mapping positions in response to the mid-air handwriting event. The handwritten track is generated based on mapping position between the starting mapping position and the ending mapping position.

The starting mapping position may be understood to be a starting position of a stroke, and the ending mapping position may be understood to be an ending position of a stroke. The starting mapping position, the mapping position between the starting mapping position and the ending mapping position, and the ending position all belong to various position points in the same stroke. Therefore, a handwritten track may be generated based on the starting mapping position, the mapping position between the starting mapping position and the ending mapping position.

Accordingly, in a more specific example, with reference to FIG. 5, there is shown a flow chart of the steps of processing a plurality of mapping positions under a mid-air handwriting event, and as shown in FIG. 5, the following steps may be specifically included:

Step S501: determining hand description information for describing a feature of a hand in the second gesture image based on the plurality of second gesture images successively acquired in response to the mid-air handwriting event;

Step S502: determining a starting mapping position and an ending mapping position from the plurality of mapping positions based on the hand description information;

Step S503: generating a handwritten track based on the mapping position between the starting mapping position and the ending mapping position.

The determination of the target mapping position may be as follows:

In an alternative example, a timestamp of each frame of the second gesture image may be acquired, and an acceleration of each frame of the second gesture image may be determined based on the timestamp. This acceleration may then be used as the hand description information. Next, a starting mapping position and an ending mapping position may be determined from the plurality of mapping positions according to a ratio of accelerations between the second gesture images of every two adjacent frames.

The acquisition process of an acceleration value between the gesture images of every two adjacent frames may be as follows: determining a timestamp and a finger position of an ith frame of gesture image, a timestamp and a finger position of an (i-1)th frame of gesture image, and a timestamp of an (i-2)th frame of gesture image, and determining a first movement speed of a finger from the (i-2)th frame of gesture image to the (i-1)th frame of gesture image on the basis of a distance between finger positions of the timestamp of the (i-1)th frame of gesture image and that of the (i-2)th frame of gesture image and a difference value between the timestamps. Then, based on the distance between the finger positions of the timestamp of the (i-1)th frame of gesture image and that of the ith frame of gesture image and the difference value between the timestamps, a second movement speed of the finger from the (i-1)th frame of gesture image to the ith frame of gesture image is determined, and according to the first movement speed and the second movement speed, an acceleration corresponding to the ith frame of gesture image may be determined.

Among them, i is an integer greater than or equal to two, namely, the above-mentioned example takes the calculation of the acceleration starting from the third frame of gesture image as an example.

Then, based on a magnitude relationship between a ratio of each acceleration and a preset ratio, and in two adjacent frames of the second gesture images where the ratio of the accelerations is greater than the preset ratio, the mapping position corresponding to the second gesture image of the previous frame is determined as the ending mapping position of one stroke, and the mapping position corresponding to the second gesture image of the subsequent frame is used as the starting mapping position of the next stroke. The preset ratio may be an empirical threshold, for example set to one point five.

When the ratio of acceleration between the gesture images of two adjacent frames is greater than or equal to the preset ratio, it is considered that an acceleration change of the current frame is caused by the user moving between starting coordinate points of different strokes or lines, and stroke segmentation may be performed here, and then the mapping position corresponding to the second gesture image of the current frame is taken as the starting position of a new stroke, and the mapping position corresponding to the second gesture image of the previous frame of the second gesture image of the current frame is taken as the ending position of the previous stroke.

For example, when the stroke "⏋" and the stroke "ゝ" are two strokes in succession, when the "⏋" writes out and the stroke "ゝ" is written, there will be a broken stroke and in this case, the user will lift the hand, so that the acceleration of the user's finger movement will change significantly from the end of the stroke "⏋" to the beginning of the stroke "ゝ", and at this time, in two frames of the second gesture image where the acceleration will change significantly, the former frame corresponds to the ending mapping position of the stroke "⏋" and the latter frame corresponds to the starting mapping position of the stroke "ゝ".

The plurality of mapping positions may be divided into a plurality of position units based on the starting mapping position and the ending mapping position. Each position unit comprises a starting mapping position, an ending mapping position, and mapping position between the starting mapping position and the ending mapping position for representing a complete stroke.

In each position unit, starting from the starting mapping position, connecting various mapping positions in the position unit successively until connecting to the ending mapping position to obtain one stroke, and a plurality of position units lead to a plurality of strokes so as to obtain a handwritten track. Alternatively, the mapping positions included in each position unit may be fitted, resulting in a stroke for each position unit, and then the strokes fitted by the plurality of position units form a handwritten track.

By way of example, if the mapping position includes (ad1, ad2, ad3, ad4, ad5, ad6, ad7, ad8, ad9, ad10, ad11, ad12, ad10-ad15), where ad6, ad10, ad13 and ad15 are ending mapping positions, and ad1, ad7, ad11 and ad14 are starting mapping positions, the resulting position units are: (ad1, ad2, a3, ad4, ad5, ad6), (ad7, ad8, ad9, ad10), (ad11, ad12, ad13), (ad14, ad15).

Among them, ad1, ad2, ad3, ad4, ad5 and ad6 in the position unit are fitted to obtain a stroke, and ad7, ad8, ad9 and ad10 in the position unit are fitted to form a stroke, and the strokes of respective position units form a handwritten track, so as to obtain the text written by the user.

The handwritten traces may be added directly to the editing interface, in which case the user's handwritten text may be displayed in the document. A printed word corresponding to the handwritten track may also be added in the editing interface, i.e., the handwritten text being converted into a standard printed font to be displayed in the editing interface. In practice, both handwritten traces and printed words may be displayed so as to reduce the difficulty of reading by other users if the user's handwriting is screamy.

When the printed words are displayed, the coordinates of the mapping positions of each position unit may be input into a pre-trained RNN network for word recognition. A suitable font (such as Song style) is selected from the front end to display the recognized text content on the designated position in the editing interface. Using this scheme to interact, more accurate segmentation results may be obtained and more beautiful display effect may be achieved.

When connecting various mapping positions in each position unit, the connection may be according to the chronological order of the mapping positions, and the chronological order of the mapping positions may be the timestamp order of the second gesture images corresponding to the mapping positions.

In the case of fitting the mapping positions included in each position unit, the nth mapping position $point_n$ is taken as an example for each position unit, the previous mapping position $point_{n-1}$ thereof and the middle point thereof are calculated as $point_n'$, and according to a set of three points [$point_{n-1}$, $point_n'$, $point_n$], a second-order Bessel curve is used to interpolate the three points into nine points, so as to realize different chirographies writing effects for each position point in the present position unit.

In an alternative example, the finger description information may describe an area occupied by an area of interest in the hand in the gesture image, or may describe a distance of the area of interest in the hand from the display screen, or may describe both the area occupied by the area of interest in the gesture image and the distance of the area of interest in the hand from the display screen. Accordingly, based on the three types of finger description information, three auxiliary means may be correspondingly provided to better perform stroke segmentation, specifically:

stroke segmentation mode 1: the starting mapping position and the ending mapping position are determined by the change of an area of the area of interest in the gesture image.

For specific implementation: an area of a region occupied by a target area in the second gesture image corresponding to each mapping position, and the area of the region occupied by the target area is determined as the hand description information. The target area includes at least one area of interest in the hand, and different areas of interest correspond to different receptive fields.

Accordingly, since the hand description information includes an area of a region of the target area in each frame of the second gesture image, an amount of change between the area of the regions corresponding to each of two adjacent frames of the second gesture images may be determined based on the hand description information, so that the starting mapping position and the ending mapping position may be determined from a plurality of mapping positions based on the amount of change.

In this embodiment, the target area may be any one of a hand area, a finger area, and a key position point area, or may include any two of a hand area, a finger area, and a key position point area, or may include a hand area, a finger area, and a key position point area. The receptive field of hand area is larger, the receptive field of finger area is medium, and the receptive field of key position point area is smaller. The receptive field may be understood to be a hand anchored to an area of different size.

In the case of including a plurality of areas, the hand description information may comprise an area of a region corresponding to respective second gesture images of every two adjacent frames in each area; then, according to the amount of change corresponding to each area respectively, an average value of the amounts of change corresponding to each area may be determined; and then, an initial mapping position and an ending mapping position are determined based on the amount of change of the average value. In this manner, it is possible to avoid the broken stroke determination according to an area change of a single area, thereby improving the accuracy of the initial mapping position and the ending mapping position.

In an alternative example, the area occupied by the target area may refer to the area of the rectangular frame area occupied by the target area; taking the target area as a finger area as an example, the area of the region may be an area of a rectangular frame area occupied by a finger, such as an index finger, in the gesture image, and may reflect the distance of the finger from the screen; for example, when the finger is closer to the screen, the area of the region is larger, and when the finger is farther from the screen, the area of the region is smaller. The rectangular frame occupied by the finger may be based on a rectangular frame of the finger box-selected by a neural network when performing position recognition on the finger.

By the same reasoning, taking the target area as the hand area as an example, the area of the region may be an area of a rectangular frame area occupied by the palm, and may reflect a distance of the hand from the screen. For example, when the palm is closer to the screen, the area is larger, and when the palm is farther from the screen, the area is smaller.

Here, a key position point area may refer to a certain joint on a finger, and in this case, the area of the region may refer to an area of a rectangular frame area occupied by the key point.

In this embodiment, the mapping position corresponding to the second gesture image located in the previous frame may be determined as the ending mapping position, and the mapping position corresponding to the second gesture image in the subsequent frame may be determined as the starting mapping position in two adjacent second gesture images of which the amount of change between the area of the regions is greater than a first preset amount of change.

The amount of change between the area of the regions respectively corresponding to each two adjacent second gesture images may reflect whether the user has an action of lifting a hand, and when the amount of change between the area of the regions is greater than the first preset amount of change, the user is characterized as having an action of lifting a hand, so that the mapping position corresponding to the first gesture image of the previous frame may be determined as the ending mapping position.

The amount of change between the area of the regions may be determined by the ratio of the areas, the first preset amount of change may be a preset ratio of the area of the regions, and when the ratio of the area of the regions corresponding to two adjacent frames of the second gesture image is greater than or equal to the preset ratio, the mapping position corresponding to the second gesture image of the previous frame may be determined to the ending mapping position, and the mapping position corresponding to the next frame may be determined to be the starting mapping position. The preset ratio of the areas may be set to zero point seven.

With this embodiment, the hand-lifting detection may be performed directly based on the area occupied by the target area on the hand, so as to accurately determine the starting mapping position and the ending mapping position, and the algorithm for determining the reginal area is relatively simple and does not occupy too much computational resources of the computer.

Stroke segmentation mode 2: the starting mapping position and the ending mapping position are determined by a change of depth corresponding to the target area in the second gesture image.

When specific implementation is performed, a depth value corresponding to the target area in a parallax image corresponding to each of the mapping positions is determined, and the depth value corresponding to the target area is taken as the hand description information; the parallax image is obtained from the second gesture images with binocular vision taken at the same moment; the target area includes at least one area of interest in the hand, different areas of interest having different receptive fields.

Accordingly, the hand description information may include a depth value corresponding to the target area in the parallax image corresponding to each mapping position, so that the amount of change between the depth values corresponding to the second gesture images of every two adjacent frames may be determined. The starting mapping position and the ending mapping position are determined from the plurality of mapping positions based on the amount of change between the depth values.

In the present embodiment, the parallax image is obtained by performing parallax processing on the basis of a second gesture image with binocular vision taken at the same moment, and in this case, two image acquisition devices may be configured on one side of the display screen to acquire two second gesture images at the same time, wherein the two second gesture images are images of binocular vision, and then the parallax of the two second gesture images acquired at the same moment is acquired on the basis of the binocular vision to obtain the parallax image. Then, the second gesture image at each moment corresponds to a parallax image, and conversely, each parallax image corresponds to the second gesture image.

Based on the parallax image, a depth value corresponding to the target area may be determined; the depth value is used for representing the distance between the target area of the hand and the screen where editing and decoding are located; in this way, the hand description information may comprise depth values respectively corresponding to the parallax images of every adjacent two frames, so that the amount of change between the depth values respectively corresponding to the parallax images of every adjacent two frames may be determined, and the amount of change may reflect whether the user has a hand lifting action; and when the amount of change between the depth values is greater than a second preset variation amount, the user is characterized as having a hand lifting action, so that the mapping position corresponding to the parallax image of the previous frame may be determined as the ending mapping position, and a mapping position corresponding to the parallax image of a subsequent frame is determined as the starting mapping position.

The amount of change between the depth values may be determined by the ratio of the depth values, and the second preset amount of change may be a preset ratio of the depth values; and when the ratio of the depth values of the fingers of two adjacent frames is greater than or equal to the preset ratio of the depth values, the mapping position corresponding to the first gesture image of the previous frame may be determined as the ending mapping position, and the mapping position corresponding to the parallax image of the subsequent frame may be determined as the starting mapping position.

The preset ratio of depth values may be set to one point two.

It should be noted that, as described above, the target area may be any one of a hand area, a finger area, and a key position point area, or may include any two of a hand area, a finger area, and a key position point area, or may include a hand area, a finger area, and a key position point area.

In the case where a plurality of areas are included, it is possible to determine the amount of change in the depth value of each area in each of the parallax images of every two adjacent frames, and determine the average value of the amounts of change corresponding to each area, thereby determining the starting mapping position and the ending mapping position based on the average amount of change in the depth value of each area in the parallax images of every two adjacent frames.

With this embodiment, the depth of the finger may be determined on the basis of binocular vision, and since the accuracy of binocular vision is higher, the accuracy of stroke segmentation may be improved, thereby obtaining a more accurate written text.

Certainly, in some embodiments, stroke segmentation mode 1 and stroke segmentation mode 2 may be used in combination. When they are used in combination, whether the starting mapping position and the ending mapping position obtained by the stroke segmentation method 1 are consistent with the starting mapping position and the ending mapping position obtained by the stroke segmentation method 2 may be determined, and if they are inconsistent, an inconsistent target mapping position may be determined, and then the starting mapping position and the ending mapping position are determined again by using the acceleration method, so as to determine a final starting mapping position and ending mapping position based on the number of similarities and differences between the starting mapping positions and the ending mapping positions determined by the three methods.

<Cursor Editing Event>

As described above, a cursor editing event refers to a movement of a cursor, and in this event, the displayed position of the cursor on the editing interface needs to change with the change of the mapping position, so as to form an editing effect of dragging the cursor by a user in mid-air.

In one embodiment, a mapping position corresponding to each of at least one frame of the second gesture image may be processed in response to the cursor editing event, and in particular, a cursor position corresponding to the second gesture image may be determined based on the mapping position corresponding to the second gesture image.

In particular, the cursor position at which the cursor is displayed may be caused to change according to a change in the mapping position.

In one example, the cursor may be moved from an initial cursor position, such that the mapping position corresponding to the second gesture image may be determined based on the initial cursor position and a position of a key point in the second gesture image, thereby obtaining the cursor position corresponding to the second gesture image.

In this way, the image acquisition device may capture the second gesture image in real time and input same to the algorithm layer; the algorithm layer calculates the coordinates of the mapping position on the screen for each frame of the second gesture image and then transmits same to the front end; and the front end displays a pre-designed cursor icon to the cursor position in the editing interface.

In particular, a mapping position of each second gesture image and a corresponding cursor position may be determined by taking the initial cursor position as a starting position; specifically, for a first second gesture image, a mapping position of the first second gesture image may be determined based on the initial cursor position and the position of a key point in the first second gesture image; then, for each subsequent mapping position, the mapping position may be determined based on a previous mapping position and the position of the key point in the second gesture image of the current frame; and when each mapping position is obtained, a cursor position corresponding to the mapping position may be determined, and the cursor movement is displayed on the cursor position, specifically, the cursor position may be a cursor area with the mapping position as a central position point; in the moving display, the entire moving process of the cursor from the previous cursor position to the next cursor position may be displayed.

In some specific application scenarios, when the size of the display screen is large, it would be very laborious for the user to control the cursor to move to the initial cursor position by means of gestures. In order to improve this situation, in an alternative example, a plurality of designated initial cursor positions may be set for the cursor in advance, different initial cursor positions may be located in different areas on the display screen, and the user may control the cursor to move to the corresponding initial cursor position by gesticulate corresponding gestures so as to move the cursor from the initial cursor position, thereby avoiding the problem of difficulty of moving the cursor by the user in the situation where the display screen is large.

Accordingly, after the editing event corresponding to the posture category is triggered, the hand in an acquired third gesture image may also be recognized; and an initial cursor position is determined based on the recognition result of the third gesture image.

Different recognition results may correspond to different initial cursor positions. In one example, the display screen may be divided into two areas, three areas or four areas, and may even be divided into more areas. The recognition result of the hand recognition may include a recognition result of a posture of the hand or a recognition result of a relative position of the hand. Accordingly, when the recognition result of hand recognition is a recognition result of hand gesture, different areas may correspond to different types of hand gestures; where the recognition result of the hand recognition is a relative position of the hand, different areas may correspond to different relative positions of the hand.

Taking dividing the display screen into left and right areas as an example, in the case where the recognition result of the hand recognition is the recognition result of the hand posture, the left area may correspond to one kind of hand posture, the right area may correspond to another kind of hand posture, and in the case where the recognition result of the hand recognition is the relative position of the hand, the left area may correspond to the position where the hand is located on the left side of the human body, and the right area may correspond to the position where the hand is located on the right side of the human body; thus, the initial cursor position may be determined by recognizing the positional relationship between the hand and the human body.

In an alternative example, different areas may correspond to different types of hand gestures, and when recognizing a hand in the third gesture image, a positional relationship between an index finger and a thumb in the third gesture image may be determined; a hand posture is recognized based on the positional relationship; different positional relationships correspond to different hand postures.

The positional relationship between the index finger and the thumb may reflect different gestures of the palm, and it may be visually understood that the index finger and the thumb constitute an arrow, where the arrow points is a selected display area, thereby moving the cursor to a preset starting position of the document in the display area.

Figure 6:
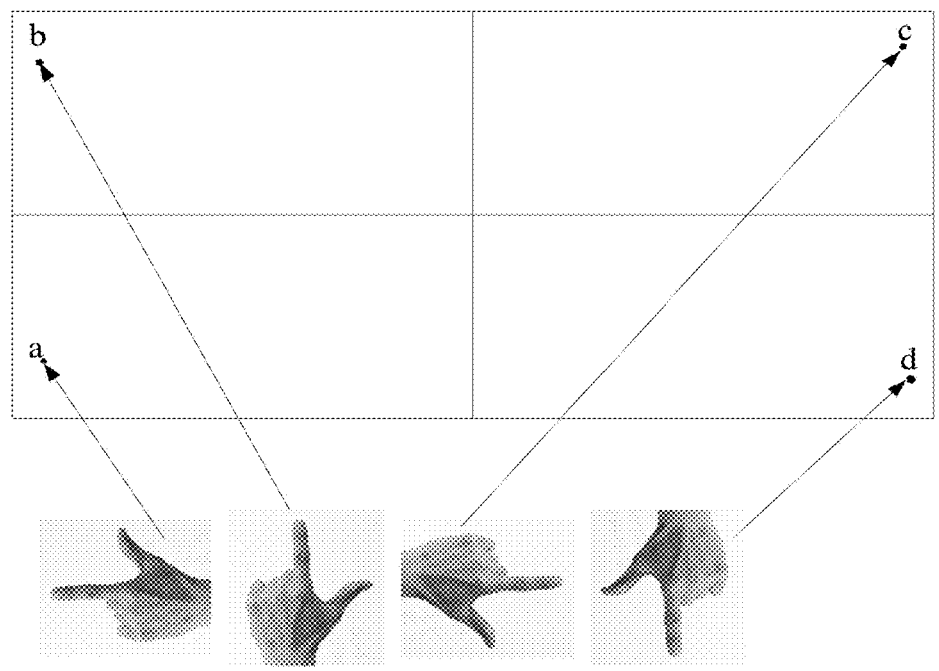
FIG. 6 schematically illustrates a correspondence diagram between a plurality of hand gestures and an initial cursor position.

Referring to FIG. 6, a correspondence diagram between a plurality of hand gestures and an initial cursor position is shown. In an alternative example, four initial cursor positions, a $[0.25 \times W_{screen}, 0.25 \times H_{screen}]$, b $[0.25 \times W_{screen}, 0.75 \times H_{screen}]$, d $[0.75 \times W_{screen}, 0.25 \times H_{screen}]$, c $[0.75 \times W_{screen}, 0.75 \times H_{screen}]$ are provided on the screen.

$W_{screen}$ represents a width of the display screen and $H_{screen}$ represents a length (height) of the display screen.

These four initial cursor positions may be selected by the user by making an upper left corner, a lower left corner, an upper right corner and a lower right corner, respectively.

In yet another example, in the process of moving a cursor on the editing interface to the initial cursor position and moving and displaying same according to the mapping positions starting from the initial cursor position, a starting position of mid-air handwriting may be determined taking one cursor position as a starting point, and then, starting from the starting position of the mid-air handwriting, mapping positions corresponding to each of a plurality of fourth gesture images are determined, and handwriting track information is generated.

In this example, in the process of controlling cursor movement under the cursor editing event, a handwriting operation may be started at a cursor position required by a user, and thus the cursor position is determined to be the handwriting starting position, and is switched to a mid-air handwriting event via a gesture; then, under the mid-air handwriting event, a handwritten track is generated according to the mapping positions corresponding to each of a plurality of fourth gesture images taking the handwriting starting position as the starting position, and the handwritten track is displayed.

The starting position of handwriting may be determined as the starting mapping position, and the handwritten track may be generated according to the starting mapping position and the mapping positions corresponding to each of the plurality of fourth gesture images. The handwritten trace may be generated in accordance with the above-described process for generating a handwritten trace in the mid-air handwriting event, which will not be described in detail herein.

<Determination of Mapping Position>

In an alternative embodiment, for each frame of the second gesture image, the image coordinates of the key point in the second gesture image in the second gesture image may be determined; and a second mapping position corresponding to the second gesture image of the frame may be determined based on the image coordinates and the first mapping position corresponding to the second gesture image of the previous frame;

The first mapping position is a mapping position determined based on a finger position in the gesture image of the previous frame.

In particular the key point may be an index finger tip, and a key point extraction model may be used to obtain the position coordinates of the index finger tip in each frame of the second gesture image, and when the mapping position corresponding to the finger position in the second gesture image of the current frame is determined, the size of the gesture image and the position of the palm in the gesture image may also be referred to, so that the determined mapping position may be more accurate, and the user's operation when editing in a mid-air may be more convenient.

The following formula (I) is used to map the position coordinates to the display coordinates on the editing interface, and the display coordinates are the mapping position:

$$\text{coordinate}_x = \alpha \times \frac{\text{delta}_x \times W_{screen}}{W_{pic}} + \text{coordinate}_{x\_pre} \quad \text{Formula (I)}$$

$$\text{coordinate}_y = \alpha \times \frac{\text{delta}_y \times H_{screen}}{H_{pic}} + \text{coordinate}_{y\_pre}$$

coordinate$_x$ and coordinate$_y$ respectively representing that the position coordinates of the finger in the second gesture image of the current frame are mapped to the second mapping position in the editing interface, and coordinate$_{x\_pre}$ and coordinate$_{y\_pre}$ representing that the position coordinates of the finger in the second gesture image of the previous frame are mapped to the first mapping position in the editing interface, and delta$_x$ and delta$_y$ respectively representing the horizontal and vertical displacement distances of the central point coordinates of a bottom edge of a key point detection frame in the second gesture image of the current frame in the gesture image, and W$_{pic}$ and H$_{pic}$ respectively representing the width and height of the gesture image, wherein a is an empirical coefficient value, which may be set as two point zero; and W$_{screen}$ and H$_{screen}$ are the width and height of the editing interface, respectively.

When the above-mentioned cursor position is calculated, the above-mentioned formula (I) may be used, and then with regard to a first frame of a second gesture image, coordinate$_{x\_pre}$ and coordinate$_{y\_pre}$ are a value in an x direction and a value in a y direction in the initial cursor position are added; for a second frame of the second gesture image, coordinate$_{x\_pre}$ and coordinate$_{y\_pre}$ are a value in an x direction and a value in a y direction in the cursor position calculated for the first frame of the second gesture image. By analogy, for the subsequent nth frame of the second gesture image, the corresponding cursor position thereof may all be obtained based on the corresponding cursor position of the previous frame of the second gesture image.

In a further embodiment, in order to improve the mapping accuracy of the position, the relative position of the key point position in the second gesture image may be used to determine its mapping position into the editing interface. In particular, an absolute coordinate of a key point in the second gesture image may be determined based on an image size of the second gesture image and the image coordinates of the key point in the second gesture image; thus, the second mapping position may be determined based on the first mapping position, the page size of the editing interface, and absolute coordinates.

The absolute coordinates may be used to characterize the position distribution of key points in the gesture image.

In particular, the following formula (II) is used to map the position coordinates to the display coordinates on the editing interface, and the display coordinates are the mapping position:

$$\text{coordinate}_x = \beta \times \frac{\text{pixel}_x \times W_{screen}}{W_{pic}} + \text{coordinate}_{x\_start}; \quad \text{Formula (II)}$$

$$\text{coordinate}_y = \beta \times \frac{\text{pixel}_y \times H_{screen}}{H_{pic}} + \text{coordinate}_{y\_start};$$

coordinate$_x$ and coordinate$_y$ respectively representing that the image coordinates of the key point in the second gesture image of the current frame are mapped to the second mapping position in the editing interface, pixel$_x$ and pixel$_y$ respectively representing the absolute coordinates of the key point in the second gesture image of the current frame, coordinate$_{x\_start}$ and coordinate$_{y\_start}$ respectively representing the corresponding first mapping position in the gesture image of the previous frame, W$_{pic}$ and H$_{pic}$ respectively representing that width and height of the gesture image, wherein β is an empirical coefficient value, which may be set as two point zero, and W$_{screen}$ and H$_{screen}$ are respectively the width and height of the editing interface.

Furthermore, in the above-mentioned mid-air handwriting event, the mapping position corresponding to each key point may be calculated using the present formula (II); then with regard to the first frame of the second gesture image, and coordinate$_{x\_start}$ and coordinate$_{y\_start}$ representing coordinates in the display screen to which the user moves the mouse at the beginning of handwriting, namely, namely, the above-mentioned cursor position, that is to say, the user may start writing when moving the cursor to a certain position, and the calculation of the cursor position may be described in the formula (1); then, with regard to the second frame of the gesture image, coordinate$_{x\_start}$ and coordinate$_{y\_start}$ are the mapping position corresponding to the first frame of the gesture image.

With such an embodiment, since the position mapping of the key points is performed with absolute coordinates, the accurate mapping of the gesture on the display screen may be achieved, the accuracy of the user's gesture control may be improved, the position error of the user performing mid-air handwriting on the editing interface may be reduced, and the user's mid-air editing experience may be optimized.

<Beauty Treatment>

In some embodiments, the user may also perform overall processing, such as zooming in and out or beautifying, on the content in a partial area in the editing interface via a corresponding gesture, wherein in the beautifying processing, the handwritten font in the area may be changed into a printed font, and in other processing, the text included in the picture in the area may be recognized and output, so that the requirements of copying the text in the picture by the user may be met.

In particular, when a fifth gesture image including two hands is detected, a first area delineated by the two hands in the fifth gesture image may be determined; the first area is mapped into the editing interface to obtain a second area, and the content in the second area is recognized to obtain the text content; thereafter, the text content is output or the document content in the second area is updated to the text content.

Key points of each hand in the fifth gesture image may be detected, and an area surrounded by the key points detected by the two hands is a first area, wherein the first area may be a rectangular area, a circular area or an area of other shapes. Therein, one hand may have one key point, or multiple key points.

Then, using the above-mentioned process of determining a mapping position, a first area is mapped into the editing interface to obtain a second area; specifically, the position coordinates of the detected key points may be mapped into the editing interface to obtain corresponding mapping coordinates, and the area surrounded by the mapping coordinates is the second area; likewise, the second area may be a rectangular area, a circular area or an area of other shapes.

The shape of the first area and the shape of the second area may be the same. Then, the document content in the second area may be recognized, and when recognizing, the second area may be cut out and input into a pre-trained optical character recognition (OCR) model, and the text content in the second area may be recognized using the OCR.

If the second area includes a picture, the text in the picture may be recognized; if the second area includes handwritten text of the user, the text content may be obtained by recognizing the handwritten text as a specified printed fonts.

After recognizing the text content, the text content may be output directly, for example, as a new document; alternatively, the document content in the second area may be updated to text content, e.g., the handwritten track in the area is cleared and re-displayed in print (text content).

Accordingly, the recognition of the first area may be a process as follows: detecting key points on the thumb of each hand in the fourth gesture image, and obtaining key point coordinates of at least two key points respectively on the fourth gesture image; determining a first area based on the key point coordinates.

In this embodiment, each hand may have one key point, and the model only needs two key points in the gesture image for detection, so as to reduce the number of key points extracted and improve the processing efficiency. The key point may be a key point on the thumb of the hand, such as a key point at the third joint on the thumb, and may of course be a key point at another position.

Next, the first area of the rectangle may be drawn with the key point coordinates of the respective derived key points on the two hands as two points on a diagonal of the rectangle. Alternatively, a first area of a circle is drawn with the distance between the key point coordinates of the respective derived key points on the two hands as the diameter.

Figure 7:
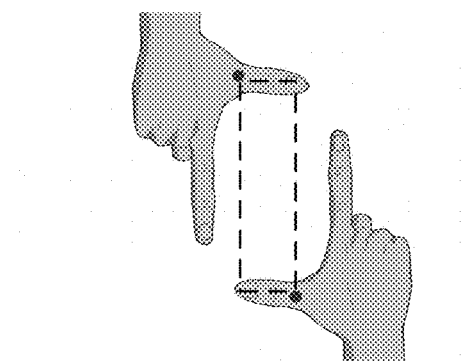
FIG. 7 schematically illustrates a diagram of obtaining a first area on a gesture image.

Referring to FIG. 7, there is shown a diagram of obtaining a first area on a gesture image, wherein the key point is a key point at a third joint on a thumb (a key point at a black point in FIG. 7), and in practice, the recognized key points may be taken as two points on a diagonal of a rectangle, and a rectangular area (a first area) shown by a dotted line in FIG. 7 may be drawn.

Certainly, in some embodiments, the user may make a gesture that characterizes the end of editing so that the current document may be saved as a file for subsequent viewing by the user in response to the gesture.

Hereinafter, an overall process of the mid-air-gesture editing method of the present disclosure is exemplified:

Firstly, when a user starts to open an editing software, such as a whiteboard demonstration software, a PPT or a word document, and needs to perform editing processing on the contents in the editing interface via a gesture, a voice instruction or an operation device may be used to issue an instruction for mid-air-gesture control, and then the computer device may execute the following steps:

S1: controlling the image acquisition device to perform image acquisition on the hand of the user, and sending the acquired gesture image to the computer.

S2: the computer being able to display a plurality of candidate icons, with different candidate icons corresponding to different editing events, such as a cursor editing event and a mid-air writing event, which in turn include an annotation event and a text editing event.

S3: recognizing a hand gesture in an acquired gesture image to obtain a posture category;

S4: the candidate icon corresponding to the posture category being displayed with highlight to assist the user in determining whether the desired editing event is selected and triggering the editing event corresponding to the selected candidate icon.

S5: respectively recognizing the key point positions in the successively acquired multi-frame second gesture images according to the triggered editing event, and respectively mapping the recognized multiple positions into the editing interface to obtain the plurality of mapping positions.

S6: processing the plurality of mapping positions in accordance with the triggered editing event, assuming that the cursor editing event is first triggered, acquiring an initial cursor position, and taking the initial cursor position as a starting point, determining a cursor position corresponding to each mapping position;

S7: displaying the cursor at each cursor position in the editing interface in turn according to the order of change of the cursor positions.

S8: when it is detected that the user stops hand movement, and a posture category corresponding to the candidate icon is recognized, for example, when a posture category corresponding to the mid-air writing event is recognized, triggering the mid-air writing event, and taking the last cursor position as the handwriting starting position.

S9: respectively recognizing the key point positions in the successively acquired multi-frame second gesture images, and respectively mapping the recognized multiple positions into the editing interface to obtain the plurality of mapping positions. According to the mid-air handwriting event, a plurality of handwritten traces of mapping positions are generated starting from the handwritten starting position.

In this case, the text editing event and the annotation event may have respective corresponding posture categories; if it is recognized that the user extends one finger to indicate that the annotation event needs to be entered, the document annotation event is started and the writing pen corresponding to the document annotation event is highlighted. It is assumed that the plurality of mapping positions include 16 mapping positions, corresponding to (ad1-ad16).

Then, the format of the document content in the editing area where the 16 mapping positions are located is determined; if it is a picture format, a fixed line width is used, for example, a corresponding line width of six pounds is used, and a yellow translucent line connects the sixteen mapping positions successively, so as to annotate the picture. If it is in a text format, the screenshot of the editing area is binarized, eroded and expanded successively, and then the area of the text connected area is calculated, and a short side of one connected area with the largest area is taken as the line width, and sixteen mapping positions are connected successively with a line with a yellow translucent color, so that the line with a yellow translucent color and adapted to the text size annotates the text content.

If it is recognized that the user extends two fingers, indicating that the text editing event needs to be entered, an initial mapping position and an ending mapping position is recognized from a plurality of mapping positions, and it is assumed that the plurality of mapping positions comprise sixteen mapping positions, corresponding to (ad1-ad16). The ending mapping position and the starting mapping position are determined from the sixteen mapping positions, and it is assumed that position units obtained by dividing the ending mapping positions and the starting mapping positions are: (ad1, ad2, ad3, ad4), (ad5, ad6) (ad7, ad8, ad9, ad10), (ad11, ad12, ad13), (ad14, ad15, a16), the mapping positions in each position unit may be fitted, resulting in one or more handwritten words, i.e., handwritten traces.

The handwritten words may be directly displayed in the editing interface, or the printed fonts obtained after word recognition of the handwritten words may be displayed in the editing interface.

Figure 8:
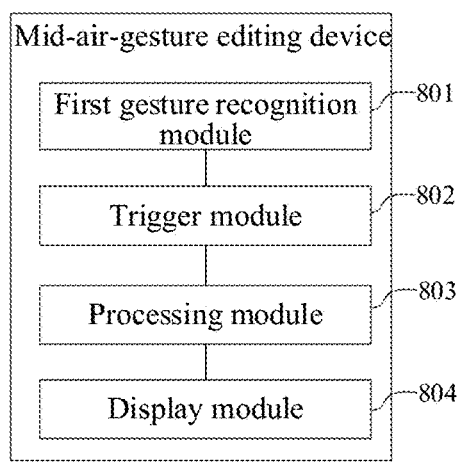
FIG. 8 schematically illustrates a structural diagram of a mid-air-gesture editing device according to the present disclosure.

Based on the same inventive concept, the present disclosure also provides an editing device applied to a display device, and as shown with reference to FIG. 8, the editing device includes the following modules:

a first gesture recognition module 801 for recognizing a hand gesture in an acquired first gesture image to obtain a posture category;

a triggering module 802 for triggering an editing event corresponding to the posture category, different posture categories corresponding to different editing events;

a processing module 803 for, in response to the editing event, processing a mapping position corresponding to at least one frame of a second gesture image, and acquiring a processing result; the mapping position being obtained after mapping a position of a key point in the second gesture image to an editing interface of the display device;

a display module 804 for adding the processing result in the editing interface.

Optionally, the editing event comprises a cursor editing event, and the processing module 803 is specifically used for determining a cursor position corresponding to the second gesture image based on a mapping position corresponding to the second gesture image;

the display module 804 is specifically used for displaying the cursor at the cursor position in the editing interface.

Optionally, the device further includes:

an initial cursor position acquisition module for acquiring an initial cursor position;

the processing module 803 is specifically used for determining a mapping position corresponding to the second gesture image based on the initial cursor position and a position of a key point in the second gesture image.

Optionally, the initial cursor position acquisition module includes:

recognition unit for recognizing hand information of a third gesture image;

a position determination unit for determining the initial cursor position based on a recognition result of the third gesture image.

Optionally, the device further includes:

a handwriting starting position determination module used for determining a starting position of mid-air writing based on the cursor position;

a handwriting response module for determining a handwriting track according to the starting position and mapping positions corresponding to each of a plurality of fourth gesture images.

Optionally, the editing event includes the mid-air writing event, and the processing module 803 is specifically configured to generate a handwritten trace based on the plurality of mapping positions in response to the mid-air handwriting event;

the display module 804 is specifically used for adding each of the handwritten traces in the editing interface.

Optionally, the processing module 803 includes:

an area determination unit for determining editing areas where the plurality of mapping positions are located on the editing interface;

a width determination unit for determining a line width corresponding to the editing areas;

a track generation unit for generating the handwritten trace according to the line width and the plurality of mapping positions.

Optionally, the width determination unit includes:

a format determination subunit for recognizing a format of a content in the editing area to obtain a content format;

a width determination subunit for determining the line width based on the content format.

Optionally, the line width is a preset width in a case where the content format is a picture format.

Optionally, in the case where the content format is a text format, the line width is a width adapted to a text area within the editing area.

Optionally, the content format includes a text format, and the width determination subunit is specifically used for:

acquiring a text connected area of the editing area;

determining the line width based on a length of a short side of the text connected area.

Optionally, the track generation unit includes:

a position determination subunit for determining a starting mapping position and an ending mapping position from the plurality of mapping positions in response to the mid-air handwriting event;

a generation subunit for generating a handwritten track based on the mapping position between the starting mapping position and the ending mapping position Optionally, the track generation unit further includes:

a description information acquisition subunit for determining hand description information for describing a change of movement of a hand based on the plurality of second gesture images successively acquired;

a position determination subunit, specifically used for determining a starting mapping position and an ending mapping position from the plurality of mapping positions based on the hand description information.

Optionally, the description information acquisition subunit is used for executing the following steps:

determining an area of a region occupied by a target area in each frame of the second gesture image, and determining an area of a region occupied by the target area as the hand description information; the target area including at least one area of interest in the hand, and different areas of interest corresponding to different receptive fields;

the position determination subunit is specifically used for determining a starting mapping position and an ending mapping position from the plurality of mapping positions based on an amount of change in the area occupied by the target area.

Optionally, the description information acquisition subunit is used for executing the following steps:

determining a depth value corresponding to the target area in a parallax image corresponding to each of the mapping positions, and taking the depth value corresponding to the target area as the hand description information; the parallax image being obtained from the second gesture images with binocular vision taken at the same moment; the target area including at least one area of interest in the hand, different areas of interest having different receptive fields;

the position determination subunit is specifically used for determining a starting mapping position and an ending mapping position from the plurality of mapping positions based on an amount of change in the depth value corresponding to the target area.

Optionally, a mapping position determination module is further included for determining a mapping position corresponding to each frame of the second gesture image comprising, which includes:

an image coordinate acquisition unit for determining image coordinates of the key point in the second gesture image;

a position mapping unit for determining a second mapping position corresponding to the second gesture image of the current frame based on the image coordinates and the first mapping position corresponding to the second gesture image of a previous frame; the first mapping position being determined based on image coordinates of the key point in the second gesture image of the previous frame.

Optionally, the device further includes:

an absolute coordinate acquisition unit for determining absolute coordinates of the key point in the second gesture image based on an image size and the image coordinates of the second gesture image; the absolute coordinates being used for representing position distribution of the key points in the second gesture image;

the position mapping unit is specifically used for determining the second mapping position based on the first mapping position, a page size of the editing interface, and the absolute coordinates.

Figure 9:
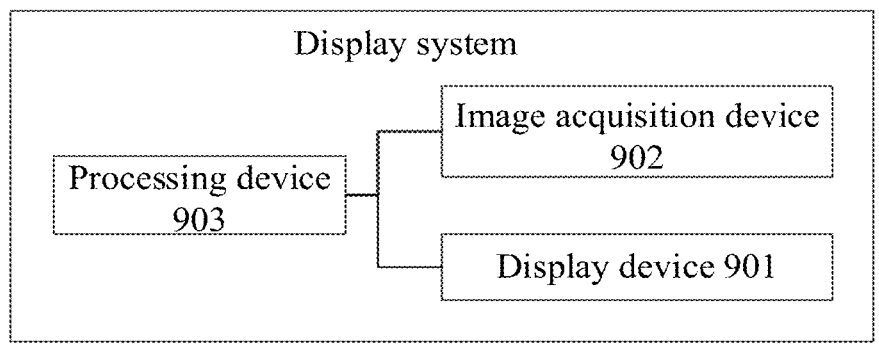
FIG. 9 schematically illustrates a structural diagram of display system according to the present disclosure.

Based on the same inventive concept, the present disclosure also provides a display system, as shown with reference to FIG. 9, an editing system including a display device 901, an image acquisition device 902 and a processing device 903, wherein the image acquisition device 902 is used for acquiring a gesture image and sending the acquired gesture image to the processing device 903; the processing device 903 is used for the mid-air-gesture editing method; and the display device 901 is used for displaying a processing result in an editing interface.

Optionally, the image acquisition device 902 and/or the processing device 903 are integrated into the display means.

Based on the same inventive concept, the present disclosure also provides a computer-readable storage medium having stored thereon computer programs that cause a processor to execute the described mid-air-gesture editing method.

Based on the same inventive concept, the present disclosure also provides an electronic apparatus including a memory, a processor, and a computer program stored on the memory and executable on the processor, which when executed, implements the described mid-air-gesture editing method.

Based on the same inventive concept, the present disclosure also provides a computer program product including computer programs/instructions that, when executed by a processor, implement the described mid-air-gesture editing method.

Finally, it should be noted that herein, relational terms such as first and second, etc., are only used to distinguish an entity or operation from another, and do not necessarily require or imply any such actual relationship or order between these entities or operations. Further, the term "comprising", "including" or any other variation thereof is intended to cover non-exclusive inclusions so that a process, method, good or equipment comprising a series of elements includes not only those elements, but also other elements not expressly listed or elements inherent in such process, method, good or equipment. Without further restrictions, the elements qualified by the statement "including a . . . " do not exclude the existence of other identical elements in the process, method, goods or equipment comprising the elements.

The above provides a mid-air-gesture editing method, device, display system and medium provided in detail herein, and a specific example is applied herein to explain the principle and embodiment of the present disclosure, and the description of the above embodiments is only used to help understand the method of the present disclosure and its core ideas. At the same time, for those generally skilled in the art, according to the idea of the present disclosure, there will be changes in the specific embodiment and the scope of application, in summary, the content of this specification should not be understood as a restriction on the present disclosure.

Those skilled in the art will easily think of other embodiments of the present disclosure after considering the description and practice of the invention disclosed herein. The present disclosure is intended to cover any variant, use, or adaptable variation of the present disclosure that follows the general principles of the present disclosure and includes common knowledge or common knowledge or customary technical means in the art not disclosed in the present disclosure. The description and embodiments are considered exemplary only, and the true scope and spirit of this disclosure are indicated by the claims below.

It should be understood that the present disclosure is not limited to the precise structure described above and shown in the accompanying drawings, and may be modified and altered without departing from its scope. The scope of this disclosure is limited only by the accompanying claims.

The term "one embodiment", "embodiment" or "one or more embodiments" herein means that the specific features, structures or characteristics described in conjunction with embodiments are included in at least one embodiment of the present disclosure. Further, note that the phrase "in one embodiment" herein does not necessarily refer to the same embodiment.

A number of specific details are explained in the instructions provided here. However, it is understood that embodiments of the present disclosure may be practiced without these specific details. In some instances, well-known methods, structures and techniques are not shown in detail so as not to obscure the understanding of this specification.

In the claims, any reference symbols located between the parentheses should not be constructed as a limitation on the claims. The word "contains" does not exclude the existence of components or steps that are not listed in the claims. The word "a/an" or "one" before the component does not exclude the existence of more than one such component. The present disclosure may be implemented by means of hardware comprising a number of different elements and by means of a properly programmed computer. In the unit claims of the enumerated devices, several of these devices may be embodied by the same hardware item. The use of the words first, second, and third does not indicate any order. These words can be interpreted as names.

Finally, it should be noted that the above embodiments are only used to illustrate the technical solution of the present disclosure, and are not limited thereto. Although the present disclosure is described in detail with reference to the foregoing embodiments, those of ordinary skill in the art should understand: they may still modify the technical solutions described in each of the foregoing embodiments, or equivalently replace some of the technical features. And these modifications or replacements do not depart the essence of the corresponding technical solutions from the spirit and scope of the technical solutions of each embodiment of the present disclosure.

The invention claimed is:

1. A mid-air-gesture editing method, applied to a display device, wherein the method comprises:
   recognizing a hand gesture in an acquired first gesture image to obtain a posture category;
   triggering an editing event corresponding to the posture category, different posture categories corresponding to different editing events;
   in response to the editing event, processing a mapping position corresponding to at least one frame of a second gesture image, and acquiring a processing result, wherein the mapping position is obtained after mapping a position of a key point in the second gesture image to an editing interface of the display device; and
   adding the processing result in the editing interface,
   wherein the editing event comprises a mid-air writing event, and in response to the editing event, processing a mapping position corresponding to at least one frame of a second gesture image comprises:
   generating a handwritten trace based on a plurality of mapping positions in response to the mid-air handwriting event; and
   the adding the processing result in the editing interface comprises:
   adding each handwritten trace in the editing interface;
   wherein generating a handwritten trace based on the plurality of mapping positions in response to the mid-air handwriting event comprises:
   determining editing areas where the plurality of mapping positions are located on the editing interface;
   determining a line width corresponding to the editing areas; and
   generating the handwritten trace according to the line width and the plurality of mapping positions; and
   wherein the determining a line width corresponding to the editing areas comprises:
   recognizing a format of a content in the editing area to obtain a content format; and
   determining the line width based on the content format.

2. The method according to claim 1, wherein the line width is a preset width when the content format is a picture format.

3. The method according to claim 1, wherein when the content format is a text format, the line width is a width adapted to a text area within the editing area.

4. The method according to claim 1, wherein the content format includes a text format, and the determining the line width based on the content format comprises:

acquiring a text connected area of the editing area;
determining the line width based on a length of a short side of the text connected area.

5. The method according to claim 1, wherein generating a handwritten trace based on the plurality of mapping positions in response to the mid-air handwriting event comprises:
   determining a starting mapping position and an ending mapping position from the plurality of mapping positions in response to the mid-air handwriting event; and
   generating the handwritten track based on the mapping position between the starting mapping position and the ending mapping position.

6. The method according to claim 5, wherein determining a starting mapping position and an ending mapping position from the plurality of mapping positions comprises:
   acquiring hand description information for describing a feature of a hand in the second gesture image based on the plurality of second gesture images successively acquired;
   determining the starting mapping position and the ending mapping position from the plurality of mapping positions based on the hand description information.

7. The method according to claim 6, wherein determining hand description information based on the plurality of second gesture images successively acquired comprises:
   determining an area of a region occupied by a target area in each frame of the second gesture image, and determining the area of the region occupied by the target area as the hand description information; wherein the target area comprises at least one area of interest in the hand, and different areas of interest corresponding to different receptive fields; and
   determining the starting mapping position and the ending mapping position from the plurality of mapping positions based on the hand description information comprises:
   determining the starting mapping position and the ending mapping position from the plurality of mapping positions based on an amount of change in the area occupied by the target area.

8. The method according to claim 6, wherein determining hand description information based on the plurality of second gesture images successively acquired comprises
   determining a depth value corresponding to the target area in a parallax image corresponding to each of the mapping positions, and taking the depth value corresponding to the target area as the hand description information; wherein, the parallax image is obtained from the second gesture images with binocular vision taken at the same moment, the target area comprises at least one area of interest in the hand, different areas of interest having different receptive fields; and
   the determining the starting mapping position and the ending mapping position from the plurality of mapping positions based on the hand description information comprises:
   determining the starting mapping position and the ending mapping position from the plurality of mapping positions based on an amount of change in the depth value corresponding to the target area.

9. A display system, comprising a display device, an image acquisition device, and a processing device, wherein
   the image acquisition device is used for acquiring a gesture image and sending the acquired gesture image to the processing device, the processing device is used for executing the mid-air-gesture editing method according to claim 1, and the display device is used for displaying the processing result in the editing interface.

10. The display system according to claim 9, wherein the image acquisition device and/or the processing device are integrated into the display device.

11. A non-transitory computer-readable storage medium, wherein computer programs having stored thereon, cause a processor to implement the mid-air gesture editing method according to claim 1.

* * * * *